(12) United States Patent
Niebling et al.

(10) Patent No.: US 7,959,359 B2
(45) Date of Patent: Jun. 14, 2011

(54) UNIT COMPRISING AT LEAST ONE CARRIER AND A WHEEL BEARING

(75) Inventors: Peter Niebling, Bad Kissingen (DE);
Gottfried Ruoff, Oberwerrn (DE);
Horst Doeppling, Herzogenaurach (DE);
Darius Dlugai, Schweinfurt (DE)

(73) Assignee: Schaeffler KG, Herzogenaurach (DE)

( * ) Notice: Subject to any disclaimer, the term of this patent is extended or adjusted under 35 U.S.C. 154(b) by 991 days.

(21) Appl. No.: 11/719,459

(22) PCT Filed: Nov. 11, 2005

(86) PCT No.: PCT/DE2005/002033
§ 371 (c)(1),
(2), (4) Date: Jul. 26, 2007

(87) PCT Pub. No.: WO2006/053530
PCT Pub. Date: May 26, 2006

(65) Prior Publication Data
US 2009/0160244 A1    Jun. 25, 2009

(30) Foreign Application Priority Data
Nov. 16, 2004 (DE) .......................... 10 2004 055 205

(51) Int. Cl.
*B60B 27/00* (2006.01)
*F16C 35/04* (2006.01)

(52) U.S. Cl. ........................................ 384/544; 384/585

(58) Field of Classification Search ............... 384/539, 384/544, 547, 584, 585, 589; 301/137; 403/50, 403/51
See application file for complete search history.

(56) References Cited

U.S. PATENT DOCUMENTS

| | | | | |
|---|---|---|---|---|
| 472,837 | A * | 4/1892 | Wheatley | 384/544 |
| 641,881 | A * | 1/1900 | O'Brien | 301/111.03 |
| 3,700,299 | A * | 10/1972 | Batt | 384/564 |
| 5,782,566 | A * | 7/1998 | Bertetti | 384/537 |
| 5,988,324 | A * | 11/1999 | Bertetti et al. | 188/18 A |
| 6,033,032 | A * | 3/2000 | Rutter | 301/6.1 |
| 6,170,919 | B1 | 1/2001 | Hofmann et al. | |
| 6,322,253 | B1 * | 11/2001 | Picca | 384/513 |
| 2003/0068109 | A1 * | 4/2003 | Brunetti et al. | 384/544 |
| 2003/0077016 | A1 * | 4/2003 | Iarrera et al. | 384/537 |
| 2004/0222694 | A1 | 11/2004 | Myers et al. | |

FOREIGN PATENT DOCUMENTS
EP    1424217 A    6/2004
* cited by examiner

*Primary Examiner* — Richard W Ridley
*Assistant Examiner* — Thomas Diaz
(74) *Attorney, Agent, or Firm* — Lucas & Mercanti, LLP

(57) ABSTRACT

A unit which has a carrier and a wheel bearing. The wheel bearing has at least one outer ring which is provided with at least one track for the rolling bodies. The wheel bearing is maintained on the carrier in a fixed manner in relation to the carrier in a first receiving element by a first connection projection, and in a second receiving element by a second connection projection, at least in both axial directions of the wheel bearing, respectively by an end which axially borders on each of the connection projections.

24 Claims, 5 Drawing Sheets

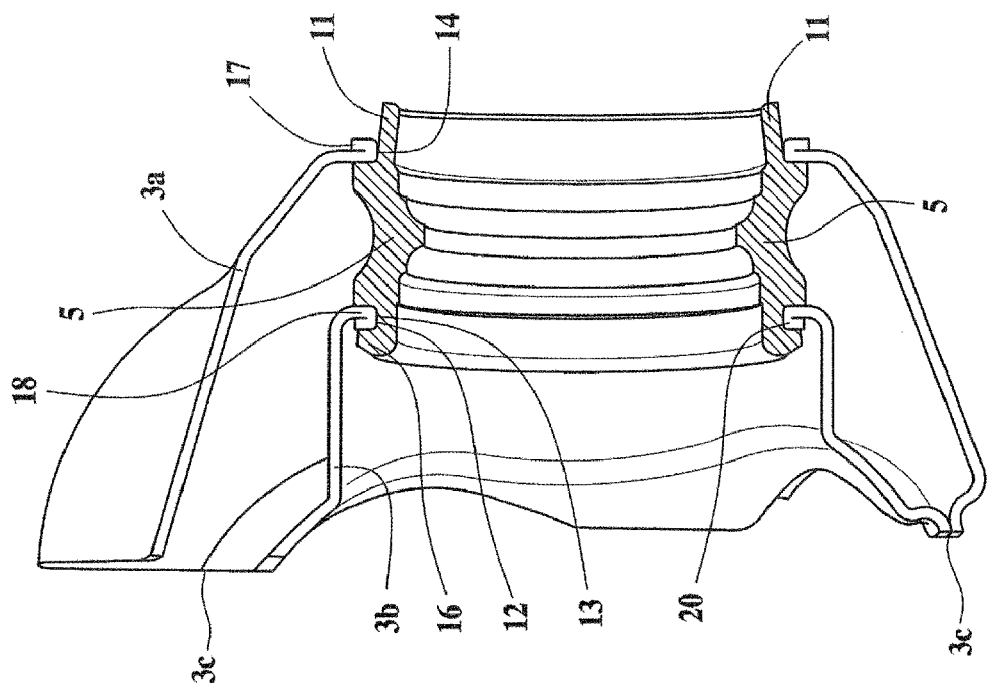
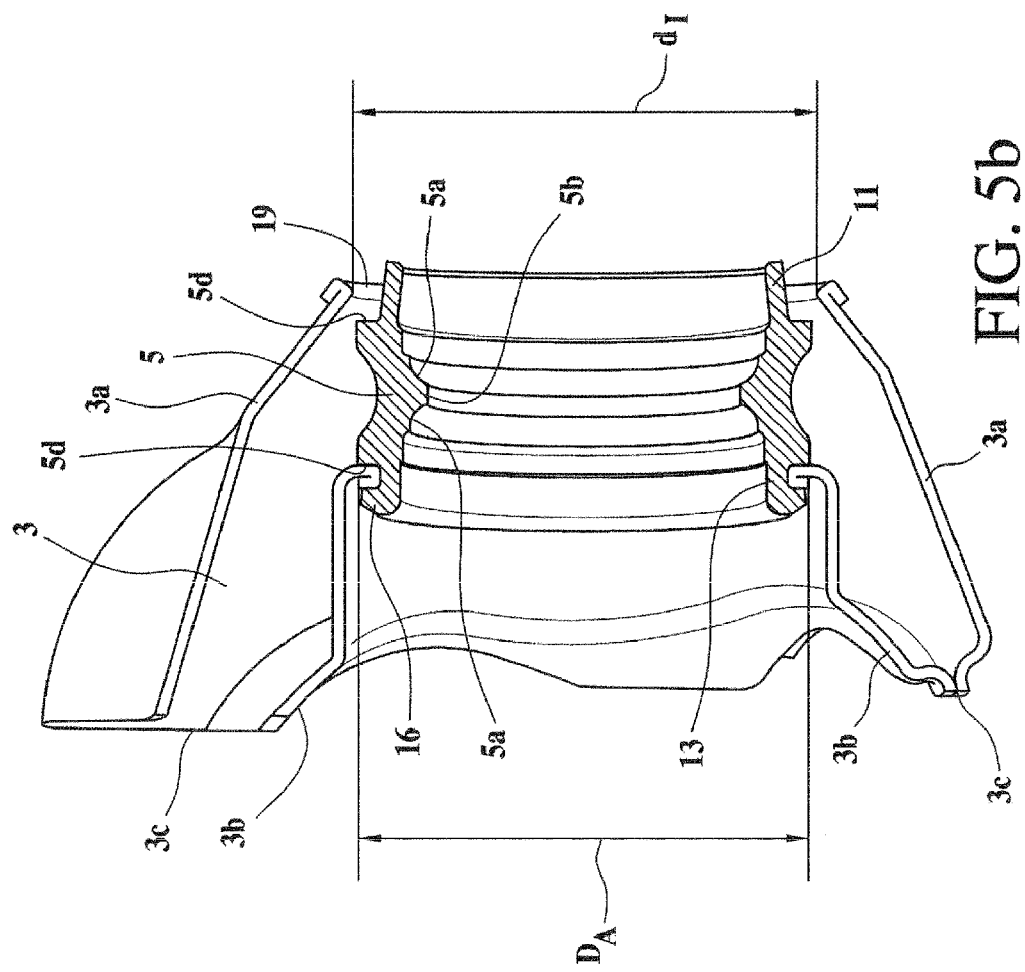

UNIT COMPRISING AT LEAST ONE CARRIER AND A WHEEL BEARING

FIELD OF THE INVENTION

The invention relates to a unit comprising a carrier and a wheel bearing, to an outer ring for the wheel bearing of the unit and to a method for assembling the unit, the wheel bearing having at least one outer ring with at least one raceway for rolling bodies, and the wheel bearing being held on the carrier in a first receptacle by means of a first connecting projection and in a second receptacle by means of a second connecting projection, immovably with respect to the carrier at least in both axial directions of the wheel bearing as a result of in each case one end which is folded over radially on each of the connecting projections.

BACKGROUND OF THE INVENTION

EP 1 424 217 A2 describes a unit of this type in greater detail. The carrier is formed from two carrier elements which are formed in shell shapes and are made from sheet metal. Each of the carrier elements has a receptacle which is formed from the edge region of the carrier element. In this case, each of the receptacles is configured to be hollow-cylindrical and identical to the other receptacle. The outer ring is introduced into the receptacles, which outer ring has to have a continuously cylindrical external shape on account of the design and arrangement of the receptacles. The connecting projections on the outer ring are arranged in such a way that they clamp the carrier axially between them. The clamping force is produced during the radial plastic folding over of the ends of the material of the connecting projections.

SUMMARY OF THE INVENTION

At the point, at which the invention was made, the object was to provide a unit comprising a carrier and the wheel bearing, which unit is inexpensive to manufacture and of robust configuration.

The object is achieved with the carrier bearing fixedly against two stops which face preferably axially away from one another, that is to say in the same direction as the rotational axis of the wheel bearing. The stops are fixed to the outer ring or to an outer part relative to the outer ring. If the stops are fixed to an outer part, at least one outer ring of the wheel bearing is accommodated in the outer part of any desired design. At least one of the stops is fixed to the outer part or preferably to the outer ring as a separate part, for example in the form of a securing ring/a securing disk for shaft seats, or is of integral configuration on the outer ring.

One of the connecting projections preferably protrudes axially from each of the stops. The connecting projection or the connecting projections is/are preferably of integral configuration on the outer ring. The outer ring is machined with the removal of material or else is a cold formed part, in which two of the raceways are formed. Each of the connecting projections protrudes axially from a basic body of the outer ring in a different direction.

The respective stop therefore protrudes radially beyond the connecting projection to such an extent that the carrier bears axially against the stop at least by way of a part of the edge zone of the receptacle on the carrier. To this end, the inner contour of the receptacle corresponds with the respective stop in such a way that the axial stop always bears against the edge zone of the receptacle even under high loads and is not pressed into the receptacle or through the latter unintentionally.

On the other side of the wall of the carrier, an end of the material of the connecting projection which is shaped radially away from the connecting projection lies opposite the stop. This end likewise protrudes radially into the edge zone, like the stop which lies opposite on the other side of the wall, to such an extent that a reliable connection is made between the carrier and the wheel bearing on the receptacle. It is also conceivable that the end which is formed radially out of the connecting projection bears axially against the edge zone of a through opening in the receptacle, within the respective receptacle, and therefore does not protrude axially, or protrudes only partially out of the receptacle. The stops are preferably circularly annular faces.

The inner contours of the receptacles and the outer contours of the connecting projections are configured as desired in all conceivable shapes which correspond with one another, but are preferably configured to be rotationally symmetrical with respect to the rotational axis of the wheel bearing. It is also conceivable that the outer ring is secured in the carrier against rotation in the circumferential direction about the rotational axis of the wheel bearing by means which engage into one another in a form-fitting manner. These form-fitting means are formed on the connecting projection or on its formed end or else on the axial stop. Form-fitting corresponding means on the receptacle or on the edge zone of the relevant receptacle correspond with these form-fitting means. These means are one or more securing means which protrude or are recessed radially or axially and correspondingly engage into one another in a form-fitting manner, such as toothing systems which are in engagement with one another.

The end is preferably a flange collar, also called a rolling rivet flange. A flange of this type is produced by plastic deformation of an annular section of the material of the connecting projection which initially protrudes radially from the connecting projection. To this end, the connecting projections are longer in the axial direction before the fastening of the outer ring in the receptacles than the respective receptacles which are assigned to one of the connecting projections and are formed in the shape of holes are wide in the axial direction. The portion of material of the connecting projections which projects in this way axially out of the receptacle beyond the carrier on that side of the carrier which faces away from the stop forms the radially folded over ends after the fastening of the outer ring to the carrier.

During the fastening of the outer ring in the carrier, the material of the connecting projections is displaced radially outward and deformed in such a way that the rivet collar/head is formed by the respective end, which rivet collar/head is configured rotationally symmetrical with respect to the rotational axis of the wheel bearing and integrally with the connecting section and protrudes radially beyond the outer circumferential face of that section of the connecting projection which remains in the through hole. The external diameter of the connecting projections is reduced at an increasing spacing from the respective axial stop, at least at the annular section which is provided for forming the end, before the ends are folded over radially. The wall thickness of the connecting projections which are configured to be rotationally symmetrical with respect to the rotational axis of the wheel bearing before the ends are folded over radially decreases as the axial spacing from the stops increases, before the ends are folded over radially. As a result of measures of this type, for example, the forming forces and the degree of forming during rolling riveting can be adapted in an optimum manner. As viewed in a longitudinal section through the connecting projection along the rotational axis of the wheel bearing, the outer contour of the connecting projections is curved or extends in a straight falling line toward the end before the ends are folded over radially.

The carrier is preferably from at least one shaped part made from sheet metal, preferably from a cold forming process. The receptacle is a through hole in the metal sheet of the carrier. Here, the wheel bearing is connected to the vehicle by means of at least one carrier or by means of two or more carrier elements which are connected to one another or not directly to one another, two carrier elements being provided with one of the receptacles each. For example, the wheel bearing is preferably held in a carrier which comprises at least two formed parts which are formed in shell shapes and are made from sheet metal. These formed parts are, for example, welded or riveted to one another. Sheet metal having a small wall thickness is preferably used for the carrier and its elements, in order to keep the weight of the unit as low as possible. Shells of this type are given high stability by a corresponding design.

In particular when thin sheet metal is used for the carrier or the carrier elements, the receptacle is formed in a doubling of the metal sheet, as one refinement of the invention provides. The doubling of the metal sheet is formed by the edge of the receptacle, which edge is first of all pushed through in the axial direction by approximately 90° with respect to the metal sheet during the manufacture of the carrier, and is then finally folded over radially in a manner which is oriented away from the center axis of the receptacle, and is positioned against the carrier.

The receptacle has a cylindrical inner circumferential face or is preferably delimited completely on the inside by an inner circumferential face which deviates from a circular shape. Accordingly, the inner circumferential face is alternatively of internally conical or spherical configuration.

The sequence of the assembly of the carrier or its elements onto an outer ring having two stops which face away from one another and in each case one connecting projection which protrudes from the respective stop is dependent on the construction of the carrier. The assembly of two carrier elements which are independent of one another is simple, as each of the carrier elements is pushed onto one of the connecting projections at its receptacle and is then fastened by folding over of the connecting projection. The carrier elements are accordingly either fixed on the outer ring individually and separately from one another or are then connected to one another to form a common carrier in a subsequent step.

For the assembly of a carrier which has both of the receptacles and in which an outer ring having two stops which face away from one another and in each case one connecting projection which protrudes from the respective stop is to be accommodated, a method is provided according to the invention. The method provides for the outer ring to be guided, during fastening to the carrier, through an opening of the carrier first and to be inserted into a recess by way of one of the connecting projections. The opening is the preform of the other receptacle, which preform is greater in assembly cross section first, and therefore has a first opening cross section which can be constricted to an opening cross section of the other recess and therefore to the outer contour of the other connecting section. The assembly opening has to have at least an opening cross section, through which the outer ring at least having the axial stops which protrude radially beyond the connecting projections passes axially, or else through which in general an outer ring having greater external dimensions than at least of the connecting projection which is introduced axially into the receptacle through the opening passes axially. After this step, the outer ring is preferably seated with an accurate fit in one of the receptacles by way of the connecting projection. The dimensions of the other connecting projection and the opening still differ from one another.

It is conceivable that first the snug fit of the connecting projection on one side of the carrier is secured axially by folding over of the connecting projection, or, as an alternative, first the opening is constricted to the cross section of the further receptacle by plastic deformation of the material in such a way that both projections are seated in one of the receptacles with an accurate fit. In this case, the connection is then finally established by production of the ends.

BRIEF DESCRIPTION OF THE DRAWINGS

In the following text, the invention will be explained in greater detail using exemplary embodiments.

FIGS. 4, 5a, 5b and 5c are partial sectional views of illustrating the individual steps of the method for assembling the assembly which in a final assembled state includes the carrier and the outer ring of a wheel bearing.

DETAILED DESCRIPTION OF THE INVENTION

Figure 1:
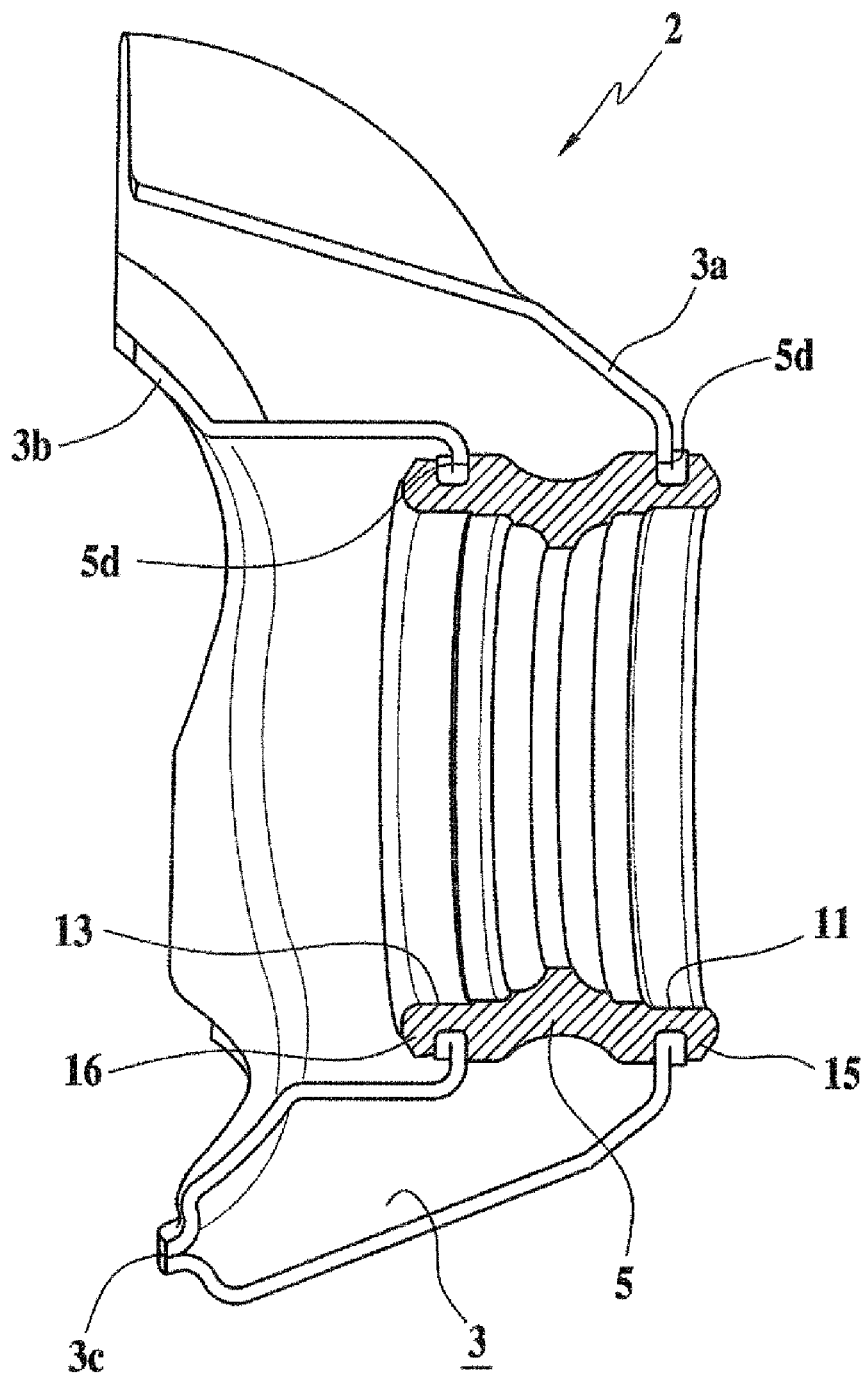
FIG. 1 is longitudinal sectional view of an assembly of a unit.

The wheel bearing 4, in this case of the type of a two-row angular contact ball bearing, is formed by the outer ring 5, inner rings 6 on a hub 7 having a flange 8, and by two rows of rolling bodies 9 in cages 10. The invention is also valid for the use of units having roller bearings.

The wheel bearing 4 is held in a first receptacle 12 by means of a first connecting projection 11 and in a second receptacle 14 by means of a second connecting projection 13, in both axial directions of the wheel bearing 4 which are identically oriented to the longitudinal center axis 1a. To this end, each of the connecting projections 11 and 13 engages axially into in each case one of the receptacles 12 and 14, respectively. The outer ring 5 is held on the carrier 3 by one end 15 and 16 which is folded over radially on each of the connecting projections 11 and 13, respectively, immovably with respect to the carrier 3.

Figure 3:
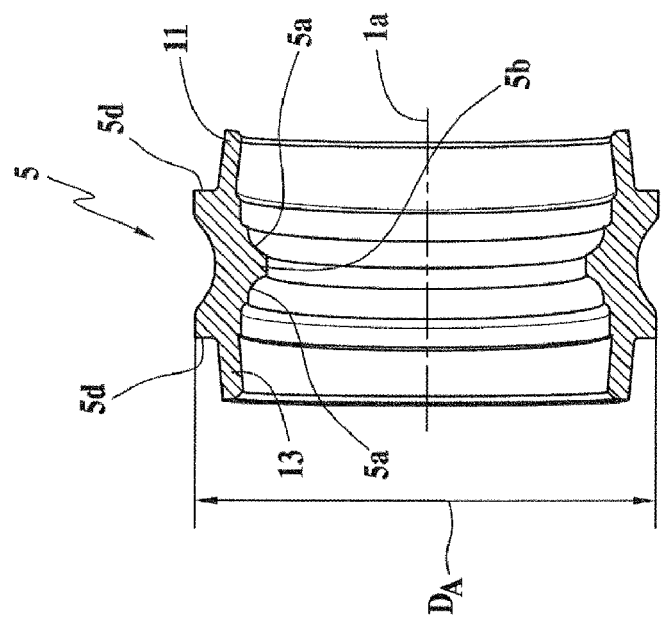
FIG. 3 is a partial sectional view of an outer ring of the unit.

The outer ring 5 which is shown as an individual part in FIG. 3 has two raceways 5a for the rolling bodies 9. The raceways 5a are formed at least partially on a center rim 5b which protrudes radially in the direction of the longitudinal center axis 1a. The outer ring 5 is preferably a cold formed part and is configured integrally with the connecting projections 11 and 13. Each of the connecting projections 11 and 13 extends from a stop 5d of the outer ring 5 which is formed on the basic body 5c in one of the axial directions in a manner which is oriented identically to the rotational axis. The stops 5d are circularly annular faces which face in one of the axial directions.

At least before the ends 15 and 16 are folded over radially, the connecting projections 11 and 13 are configured to be rotationally symmetrical with respect to the rotational axis 1a of the wheel bearing 4, in such a way that the external diameter of the outer contour of the connecting projections 11 and 13 becomes smaller as the spacing from the respective axial stop 5d increases. The radial wall thickness of the connecting projections 11 and 13 decreases as the axial spacing from the stops 5d increases. The outer contour line falls away in a curved manner toward the free axial end.

The above-described outer ring 5 is configured to be rotationally symmetrical and axially symmetrical. It is also conceivable that an outer ring of this type is not configured to be rotationally symmetrical and axially symmetrical. There is also provision for the radial and/or axial dimensions of the connecting projections on an outer ring to differ from one another. In a correspondingly adapted manner, the receptacles of a carrier then also have different dimensions from one another.

Figure 2:
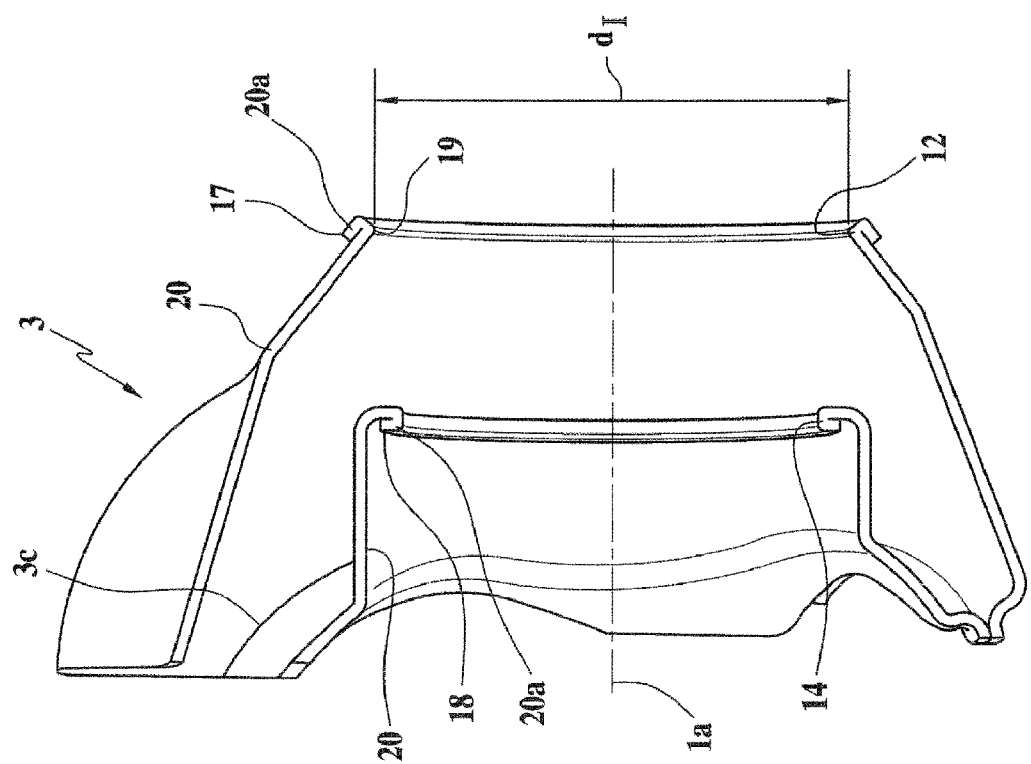
FIG. 2 is a partial sectional view of a carrier of the unit.

The carrier 3 is shown in FIG. 2 and is formed from two carrier elements 3a and 3b. Each of the carrier elements 3a, 3b is a shell-shaped formed part made from sheet metal from cold forming processes in this application. The carrier elements 3a and 3b are fastened to one another by means of sheet metal connections 3c. It is also conceivable that the wheel bearing 4 is fastened to two carriers 3a and 3b which are not connected directly to one another. One of the receptacles 12 or 14 is formed in each of the carrier elements 3a and 3b. FIG. 2 shows the receptacle 12 in the preform, in the form of the opening 19.

The receptacles 12 and 14 are formed within a doubling 17 and 18, respectively, of the metal sheet. The doubling 17, 18 is formed by a portion 20a of the metal sheet 20 which is folded over radially outward away from the rotational axis 1a of the unit 1 by the respective receptacle 12, 14 and adjoins the metal sheet 20 of the carrier element 3a, 3b axially. The internal contour of the receptacles 12, 14 is of spherical configuration and therefore deviates from a circular-cylindrical internal shape.

Figure 4:
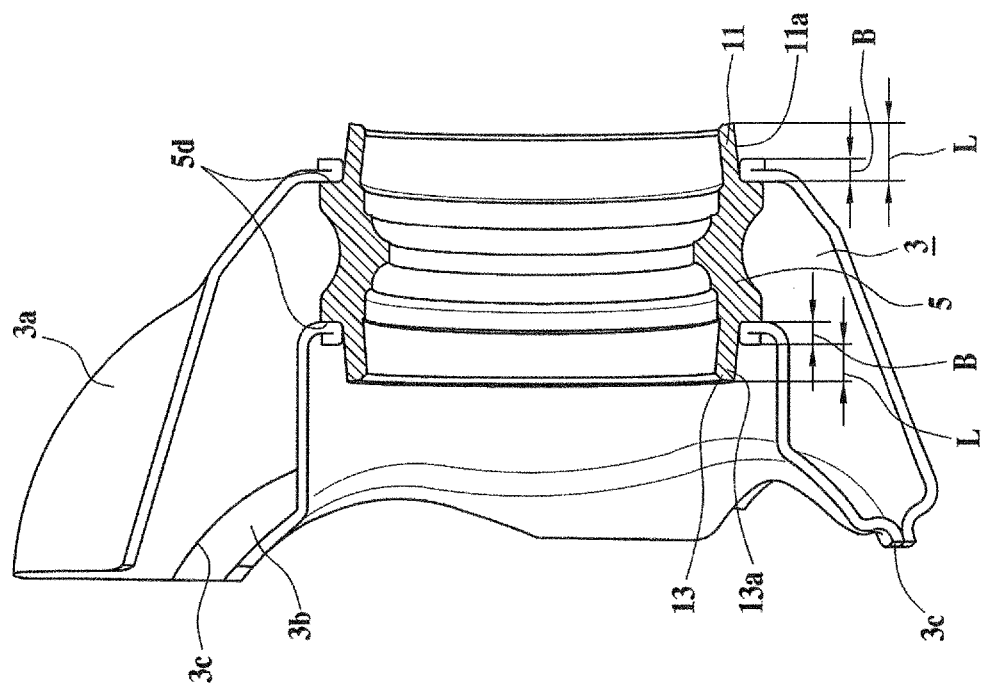

During the assembly of the outer ring 5 in the carrier 3, the outer ring 5 is first of all guided through an opening 19 of the carrier 3 (of the carrier element 3b) in the direction which is labeled by way of the arrow (FIG. 4) and is introduced into the second recess 14 by way of the second connecting projection 13. It is conceivable here that the connecting projection 13 is pressed into the recess 14 or else is introduced with a sliding snug fit. The opening 19 has an opening cross section which is described by the diameter d1. d1 is greater than the maximum external diameter DA of the outer ring 5. The maximum external diameter DA also describes the external dimension of the circularly annular faces on the stops 5d. can be constricted to a second opening cross section of the first recess, and the first opening cross section being at least so large that the outer ring having the axial stops can be guided through the opening.

After the introduction of the second connecting projection 13 into the second receptacle 14, the assembly of the structural unit can optionally be continued with the equivalent method steps which are described in the following:

According to one of the alternative method steps, the outer ring 5, as shown in FIG. 5b, is first fastened to the carrier 3 or the carrier element 3b, by radial folding over of the second end 16 of the material of the connecting projection 13, in a manner which bears against one of the axial stops 5d. This step is then followed by a further step, in which the opening 19 is constricted by a plastic deformation with respect to the first receptacle 12 in such a way that the first receptacle 12 engages around the first connecting projection 11. This state is shown in FIG. 5c. Finally, the outer ring 5 is fastened to the carrier 3 or the carrier element 3b by radial folding over of the first end 15 of the material of the connecting projection 11, in a manner which bears against one of the axial stops 5d, which results in the structural unit 2 which is shown in FIG. 2.

Figure 5A:
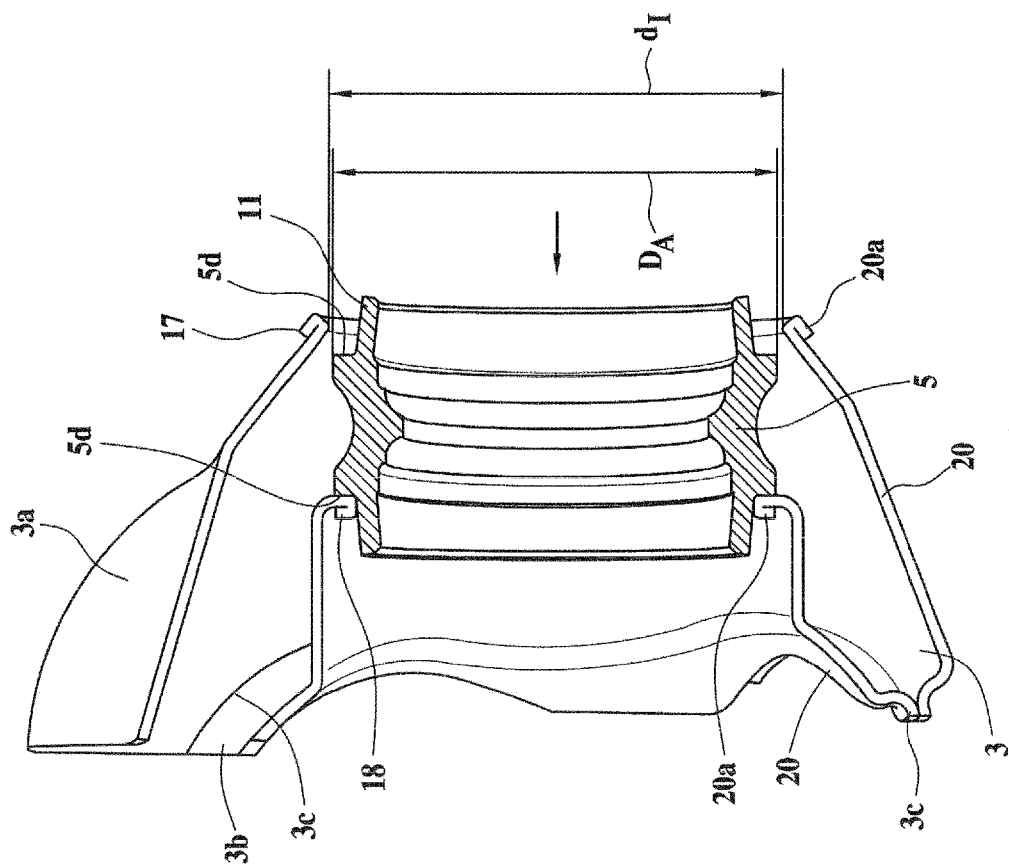

According to the other of the alternative method steps, the outer ring 5, as shown in FIG. 5a, is first held axially between the carrier elements 3a and 3b. To this end, the opening 19 is constricted by plastic deformation with respect to the first receptacle 12 in such a way that the first receptacle 12 engages round the first connecting projection 11. Finally, the outer ring 5 is fastened to the carrier 3 or the carrier element 3a or 3b by radial folding over of the first end 15 of the material of the connecting projection 11 and by delayed or simultaneous radial folding over of the second end 16 of the material of the connecting projection 13, in a manner which bears against one of the axial stops 5d, which results in the structural unit 2 which is shown in FIG. 2.

As can be seen from the illustrations in FIGS. 5a and 5b, the connecting projections are longer (L) in the axial direction before fastening of the outer ring in the receptacles than the respective receptacles which are assigned to one of the connecting projections and are formed in the shape of holes are wide (B) in the axial direction (L>B). The axially protruding portion (annular sections 11a and 13a) has the portion of material which forms the radially folded over ends 15 and 16 after fastening of the outer ring 5 to the carrier 3. On the structural unit which is in the finally assembled state, each of the connecting projections 11, 13 engages axially through one of the recesses 12, 14 in such a way that in each case one of the stops 5d and one of the ends 15 and 16 accommodate a part of the carrier axially between them.

Figure 6:
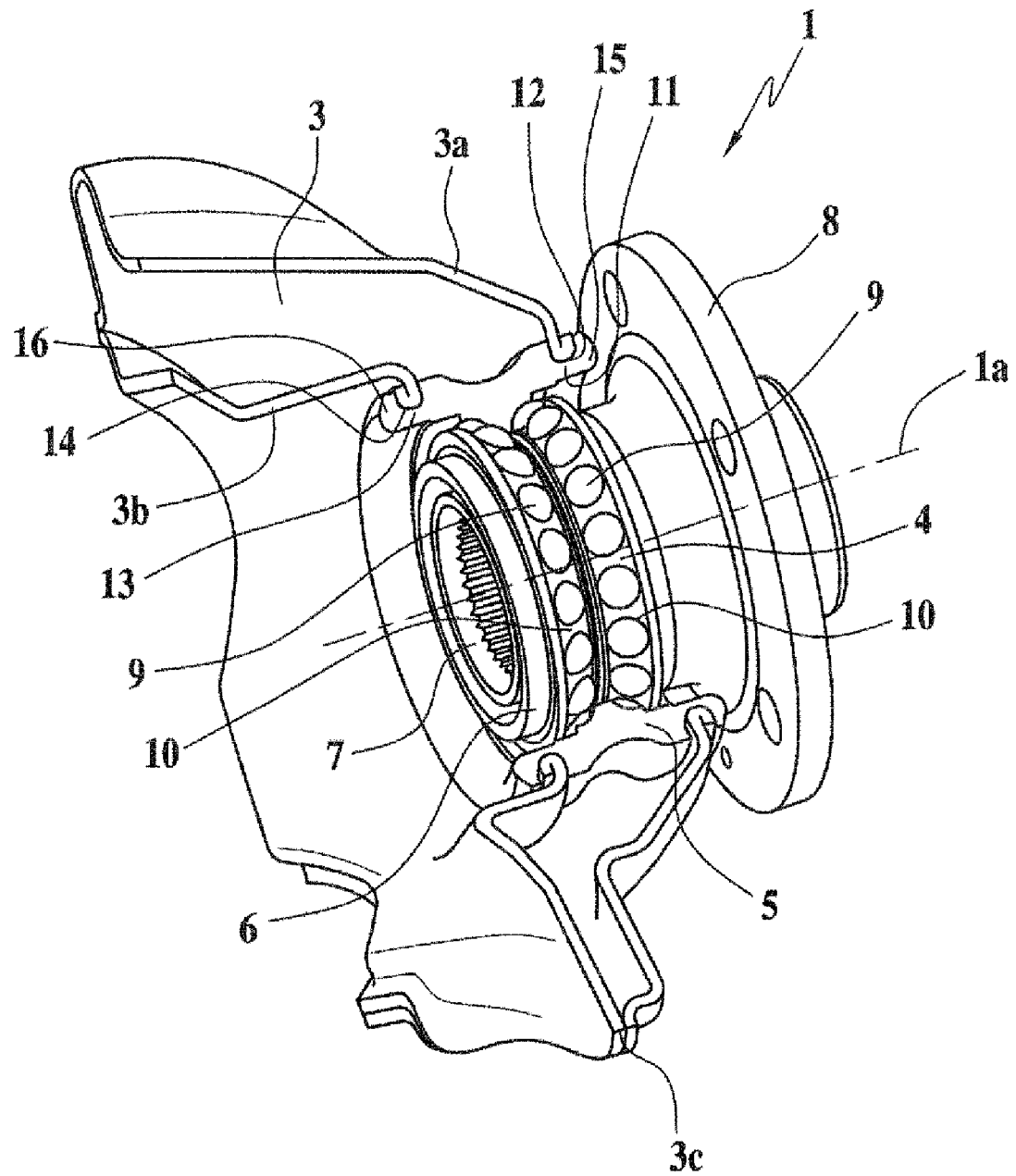
FIG. 6 is a partial sectional view of the unit with the carrier and the wheel bearing.

FIG. 6 illustrates the unit 1 in a final assembled state. The unit comprises the carrier 3 and the wheel bearing 4 as shown in a partially sectioned view.

The invention claimed is:

1. A unit, comprising:

a carrier having at least one part with two ends, each of the ends made from sheet metal; and a wheel bearing, the wheel bearing having at least one outer ring with at least one raceway for rolling bodies, and the outer ring held by the carrier in a first receptacle by means of a first connecting projection and the outer ring held by the carrier in a second receptacle by means of a second connecting projection, each of the ends of the carrier being folded over radially such that one of the ends forms a first doubling of sheet metal and another of the ends forms a second doubling of sheet metal, the first doubling and the second doubling each being formed b a portion of the sheet metal which is folded over radially outward, away from a rotational axis of the unit and adjoins sheet metal of the carrier axially, the outer ring having two stops which face away from one another, the stops being fixed relative to the outer ring, and the first connecting protection extending outward from one of the stops and a second connecting projection extending outward from another of the stops, the first connecting projection being radially reshaped to form the first receptacle between the first connecting projection, which is reshaped, and the one of the stops and the second connecting projection being radially reshaped to form the second receptacle between the second connecting projection, which is reshaped and the another of the stops, and the first doubling of metal sheet being positioned within the first receptacle so as to immovably hold the carrier on the outer ring and the second doubling of metal sheet being positioned within the second receptacle so as to immovably hold the carrier on the outer ring.

2. The unit as claimed in claim 1, wherein the stops face axially away from one another, and in that the receptacles lie axially opposite one another.

3. The unit as claimed in claim 1, wherein one of the connecting projections protrudes axially from each of the stops.

4. The unit as claimed in claim 1, wherein at least one of the stops is formed integrally on the outer ring.

5. The unit as claimed in claim 4, wherein both of the stops and both of the connecting projections are formed integrally with the outer ring, each of the connecting projections reaching axially through a recess, and in that one of the stops and one of the ends each accommodate one part of the carrier axially between them.

6. The unit as claimed in claim 1, wherein the formed part is manufactured from a cold forming process.

7. The unit as claimed in claim 1, wherein at least one of the receptacles is delimited completely on the inside by an inner circumferential face which deviates from a circular shape.

8. The unit as claimed in claim 1, wherein the carrier is formed from at least two carrier elements, each of the carrier elements being provided with one of the receptacles.

9. The unit as claimed in claim 8, wherein the carrier elements are connected to one another.

10. The unit as claimed in claim 1, wherein the outer ring is at least one cold formed part.

11. The unit as claimed in claim 1, wherein two of the raceways are formed in the outer ring.

12. The unit as claimed in claim 1, wherein each of the connecting projections extends axially from a basic body of the outer ring in a different direction, each of the connecting projections protruding from at least one of the stops which are formed on the basic body.

13. The unit as claimed in claim 12, wherein the stops are circularly annular faces.

14. The unit as claimed in claim 12, wherein portions of material of each of the connection projections forms the ends of the carrier which are folded over radially, forming the receptacles.

15. The unit as claimed in claim 12, wherein the connecting projections are rotationally symmetrical with respect to the rotational axis of the wheel bearing.

16. The unit as claimed in claim 12, wherein external diameter of the connecting projections is reduced as a spacing from the stops increases.

17. The unit as claimed in claim 16, wherein, as viewed in a longitudinal section through the outer ring along the rotational axis of the wheel bearing, the outer contour of the connecting projections is curved.

18. The unit as claimed in claim 12, wherein the connecting projections each have a wall thickness which is rotationally symmetrical with respect to the rotational axis of the wheel bearing.

19. A method for assembling a unit as claimed in claim 1, wherein, during fastening to the carrier, the outer ring is first of all guided through an opening of the carrier and is inserted into the second receptacle by way of the second of the connecting projections, the opening having a first opening cross section which can be constricted to a second opening cross section of the first receptacle, and the first opening cross section being at least so large that the outer ring having the stops can be guided through the opening.

20. The method as claimed in claim 19, wherein the outer ring is fastened at least to one part of the carrier by radial folding over of the second end of the material of the second connecting projection, in a manner which bears against one of the stops.

21. The method as claimed in claim 20, wherein the opening is constricted by elastic and plastic deformation with respect to the first receptacle, the first receptacle engaging around the first connecting projection.

22. The method as claimed in claim 21, wherein the outer ring is fastened to the carrier by radial folding over of the first end of the material of the first connecting projection, in a manner which bears against the other of the stops.

23. The method as claimed in claim 19, wherein first the outer ring is fastened at least to one part of the carrier by radial folding over of the second end of the material of the second connecting projection, in a manner which bears against one of the stops, and in that, in a further method step, the opening is then constricted by elastic and plastic deformation with respect to the first receptacle, the first receptacle engaging around the first connecting projection.

24. The method as claimed in claim 23, wherein, the outer ring is fastened to the carrier by radial folding over of the first end of the material of the first connecting section, in a manner which bears against the other of the stops.

* * * * *